US010918979B2

(12) United States Patent
Medina et al.

(10) Patent No.: US 10,918,979 B2
(45) Date of Patent: Feb. 16, 2021

(54) GLUE BEADED MEDIA FOR POOL AND SPA FILTER CARTRIDGES

(71) Applicant: Pleatco, LLC, Glen Cove, NY (US)

(72) Inventors: Richard Medina, Hollis, NY (US);
Rakshith Asokan, Levittown, NY (US);
Abhilash Pillai, Westbury, NY (US)

(73) Assignee: Pleatco, LLC, Louisville, KY (US)

( * ) Notice: Subject to any disclaimer, the term of this patent is extended or adjusted under 35 U.S.C. 154(b) by 42 days.

(21) Appl. No.: 16/120,971

(22) Filed: Sep. 4, 2018

(65) Prior Publication Data

US 2019/0070531 A1    Mar. 7, 2019

Related U.S. Application Data

(60) Provisional application No. 62/554,179, filed on Sep. 5, 2017.

(51) Int. Cl.
| | | |
|---|---|---|
| *B01D 29/21* | (2006.01) | |
| *B01D 29/11* | (2006.01) | |
| *B01D 39/16* | (2006.01) | |

(52) U.S. Cl.
CPC .......... *B01D 29/21* (2013.01); *B01D 29/111* (2013.01); *B01D 39/16* (2013.01); *B01D 2201/04* (2013.01); *B01D 2201/0415* (2013.01); *B01D 2201/127* (2013.01); *B01D 2201/291* (2013.01); *B01D 2201/602* (2013.01)

(58) Field of Classification Search
CPC ...... B01D 29/21; B01D 39/16; B01D 29/111; B01D 2201/291; B01D 2201/602; B01D 2201/0415; B01D 2201/127; B01D 2201/04
USPC ............ 210/493.2, 493.1, 497.01, 490, 487, 210/167.12, 167.1, 416.2, 232, 450, 210/493.5, 494.1, 497.2
See application file for complete search history.

(56) References Cited

U.S. PATENT DOCUMENTS

| | | |
|---|---|---|
| D306,640 S | 3/1990 | Kott .............................. D23/209 |
| 5,211,846 A | 5/1993 | Kott et al. ..................... 210/232 |
| 5,552,048 A * | 9/1996 | Miller .................. B01D 29/012 |
| | | 210/489 |
| D402,735 S | 12/1998 | Kott .............................. D23/209 |
| D403,740 S | 1/1999 | Kott et al. ..................... D23/209 |
| 7,416,663 B2 | 8/2008 | Kott et al. ..................... 210/232 |

* cited by examiner

*Primary Examiner* — Madeline Gonzalez
(74) *Attorney, Agent, or Firm* — Bodner & O'Rourke, LLP; Gerald T. Bodner; Christian P. Bodner

(57) ABSTRACT

A water filter cartridge includes a top end cap, a bottom end cap, a central support core and a pleated filter medium surrounding the central support core. The pleated filter medium includes glue beads formed on one or both of the outer surface and the inner surface of the pleated filter medium. The glue beads on the outer surface may be offset from the glue beads on the inner surface. The beads form ribs between the folds of adjacent pleats, which help maintain a rigid spacing between adjacent pleats of the filter medium and minimize the filter medium collapsing under water pressure when in use in a pool or spa filtering apparatus.

7 Claims, 15 Drawing Sheets

GLUE BEADED MEDIA FOR POOL AND SPA FILTER CARTRIDGES

CROSS-REFERENCE TO RELATED APPLICATIONS

This application is related to U.S. Provisional Application Ser. No. 62/554,179, filed on Sep. 5, 2017, and entitled "Glue Beaded Media for Pool and Spa Filter Cartridges", the disclosure of which is incorporated herein by reference and on which priority is hereby claimed.

BACKGROUND OF THE INVENTION

Field of the Invention

The present invention generally relates to filter cartridges for pools and spas, and more specifically relates to the media used in such pool and spa filter cartridges.

Description of the Prior Art

The various structures of filter cartridges for use with pools and spas are well known in the art and are disclosed, for example, in U.S. Pat. No. 5,211,846, which issued to Leonard B. Kott and Aaron D. Kott; U.S. Pat. No. 7,416,663, which issued to Leonard B. Kott and James Tormey; DES. 403,740, which issued to Aaron D. Kott and Leonard B. Kott; DES. 402,735, which issued to Leonard B. Kott; and DES. 306,640, which issued to Aaron D. Kott, the disclosure of each of which is incorporated herein by reference. A typical filter cartridge 2 is shown in FIG. 1 of the drawings. Such filter cartridges generally include a bottom end cap 4 having a central opening 6 formed through the thickness thereof for receiving a fitting 8, a top end cap 10, which may optionally have a handle 12 affixed thereto, a perforated, elongated core 14 which axially extends between the top and bottom end caps 10, 4 and which is typically cylindrical in shape, and a preferably pleated filter medium 16 situated between the top and bottom end caps 10, 4 and disposed circumferentially about the core 14. Typically, the pleated filter medium 16 is made from a spun bonded 100% polyester but can be made from other materials manufactured through other processes.

The filter medium 16 of the cartridge 2, when in use in a filtering apparatus for pools, spas and the like, is under significant pressure. The inner core 14 is provided to help prevent the filter medium 16 from collapsing under such pressure.

It is also important to maintain the spacing between the folded pleats of the medium 16 for proper filtering and water flow through the medium 16. Very often, the spacing between adjacent pleats may close and prevent water from flowing through the filter in that section, reducing the overall filtering capability of the cartridge 2 and increasing water pressure through the cartridge 2 in other areas. Notwithstanding the support provided by the inner core 14 of the filter cartridge 2, because of the high water pressures exerted on the medium 16, it is still possible for the pleats of the medium 16 to fold inwardly and for the medium 16 to collapse over portions thereof. So, maintaining an adequate spacing between adjacent pleats of the medium in a filter cartridge is important.

More specifically, pool or spa filter cartridges 2 that use pleated media 16 from materials such as polyester rely on a mechanical support to prevent collapse of the media 16 from an axial flow of water while in operation. That support oftentimes is a perforated core 14 made of a hard plastic whereby the core 14 acts as a backstop preventing the media 16 from buckling. While the core 14 is usually sufficient to prevent the collapse of the media 16, it has been discovered by the inventors herein that once contamination is introduced into the flow, the pleats of the media 16 tend to collapse on themselves, reducing effective filtration area and efficiency. This effect is known as clumping or bunching.

There are other instances where an underlayment of another stiff media is pleated with the primary filter media 16. This co-pleated product can provide the stiffness needed for the rigors of service; however, the addition of the underlayment (typically made from a coarse heavy wall plastic mesh or metal) will reduce the amount of media 16 inside the filter, as it is packed with the pleat support rather than the primary filter media 16.

OBJECTS AND SUMMARY OF THE INVENTION

It is an object of the present invention to provide a pleated filter medium for use in a pool or spa filter cartridge in which the spacing between adjacent pleats of the medium is maintained.

It is another object of the present invention to provide a method for manufacturing a filter medium for use with a pool or spa filter cartridge.

It is a further object of the present invention to provide a filter cartridge for use with pools and spas that includes a pleated filter medium in which the spacing between adjacent pleats of the medium is maintained.

It is yet a further object of the present invention to provide a filter cartridge for use with pools and spas which has a longer useful filtration life before being needed to be serviced or replaced and which further maintains proper flow of water through the filter medium thereof relatively longer than conventional pool and spa filter cartridges.

In accordance with one form of the present invention, a medium for use in filter cartridges for pools and spas is preferably formed from an elongated web of pleated polyester material. During the formation of the medium and prior to it being assembled with the top and bottom end caps and inner core (which may be optional), forming the filter cartridge, one or more, parallelly disposed, continuous beads of glue are deposited on either the front surface or the rear surface, or both surfaces, of the filter medium. Preferably, several spaced apart, continuous or intermittent glue beads are deposited on one or both surfaces of the filter medium and running perpendicularly to the pleats formed in the medium so that, when the medium is assembled between the end caps of the filter cartridge, the glue beads will extend transversely to the longitudinal axis of the filter cartridge, spaced apart in parallel lines along the length thereof.

After the glue beads have been applied to either the front surface or the rear surface, or both surfaces, of the filter medium, the filter medium is folded in an accordion fashion created in such a fashion so as to make it favorable for the formation of a cylindrical form. Portions of each glue bead on adjacent pleats of the filter medium will adhere to each other and, when solidified, will form a rib between the adjacent pleats on each side of the pleated medium. The ribs thus formed maintain a rigid spacing between adjacent pleats of the filter medium and prevent, or at least minimize, any occurrence of the filter medium collapsing, folding in on itself, or bunching under water pressure when in use in a pool or spa filtering apparatus.

Preferably, a hot melt glue is applied in parallel lines on the medium web after the pleats are formed in the web but prior to the web being cut to a desired length and folded into the cylindrical shape of a pleated medium. The glue beads are allowed to set and at least partially solidify for a predetermined period of time before the web is cut and formed into a folded pleated medium, so that the glue beads will not run and will maintain their spaced apart position on the filter medium.

After the predetermined period of time has elapsed, the web is cut into a desired length, and the pleats are folded upon each other, accordion style, such that portions of the glue beads on adjacent pleats will adhere to one another and form the ribs, described previously, between adjacent pleats, preferably on the front surface and perhaps the rear surface of the filter medium. When hardened, the ribs will maintain the spacing between adjacent pleats in the medium. The medium is assembled with the end caps and the inner core to form a replacement cartridge for use in a pool or spa filtering apparatus.

The glue-beaded media approach solves both the problem of pleat bunching as well as pleat count optimization. Banks of nozzles dispense a small amount of equally-spaced adhesive lines on pre-pleated media which then are brought together and allowed to cool. The amount of spacing is controlled so that the gap between the pleats is consistent from pleat to pleat. The now hardened adhesive creates small quadrants within the media itself, creating much smaller yet stiffer sections of media exposed to the axial flow. Moreover, because the media and the adhesive in its semi-rigid form can be compressed to very tight tolerances, little is lost to the support structure created. Furthermore, the use of this technique gives the manufacturer other degrees of design freedom, as detailed below.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
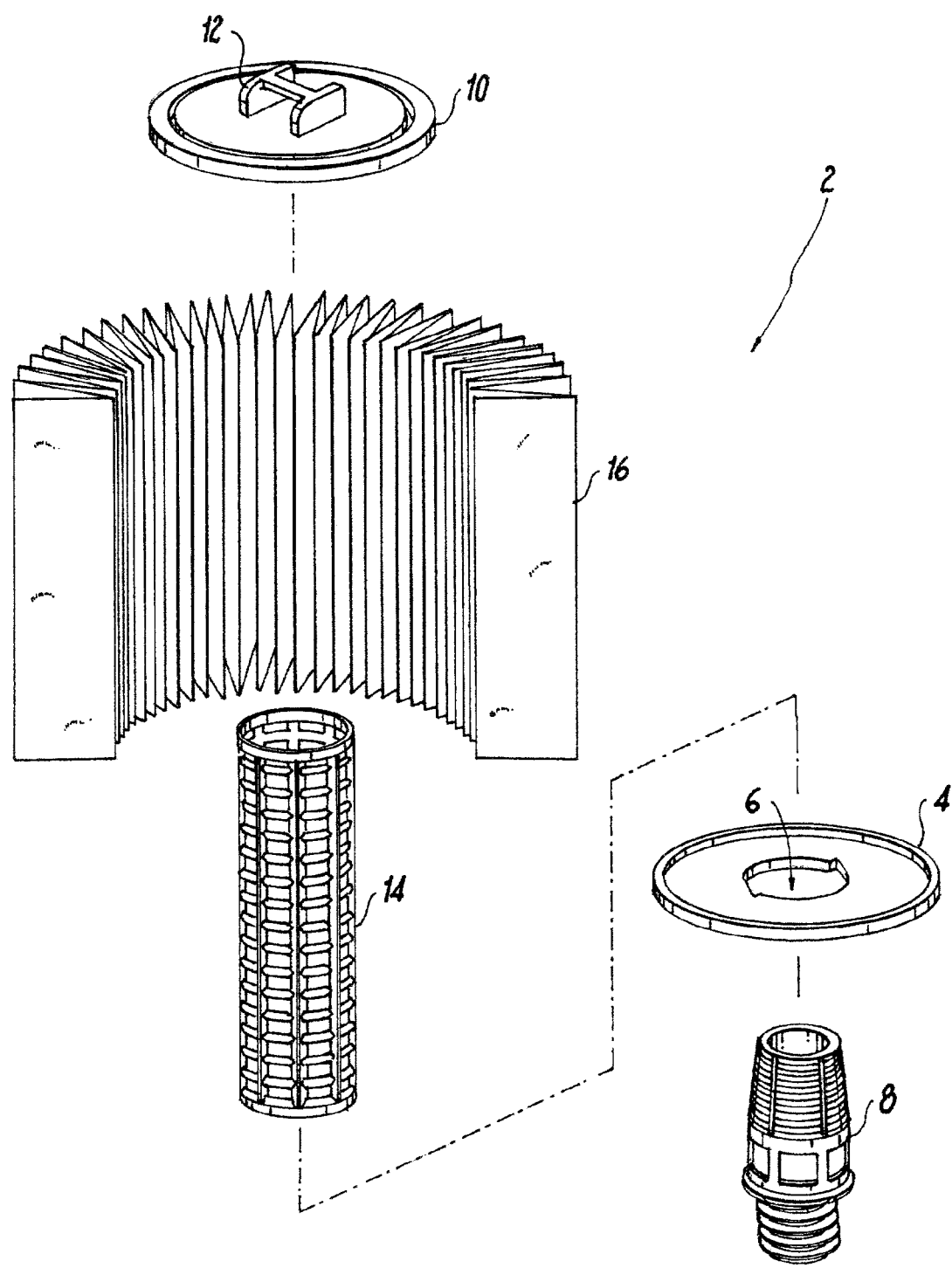
FIG. 1 is an exploded perspective view of a conventional filter cartridge for use with pool or spa filtering apparatus.
Figure 2:
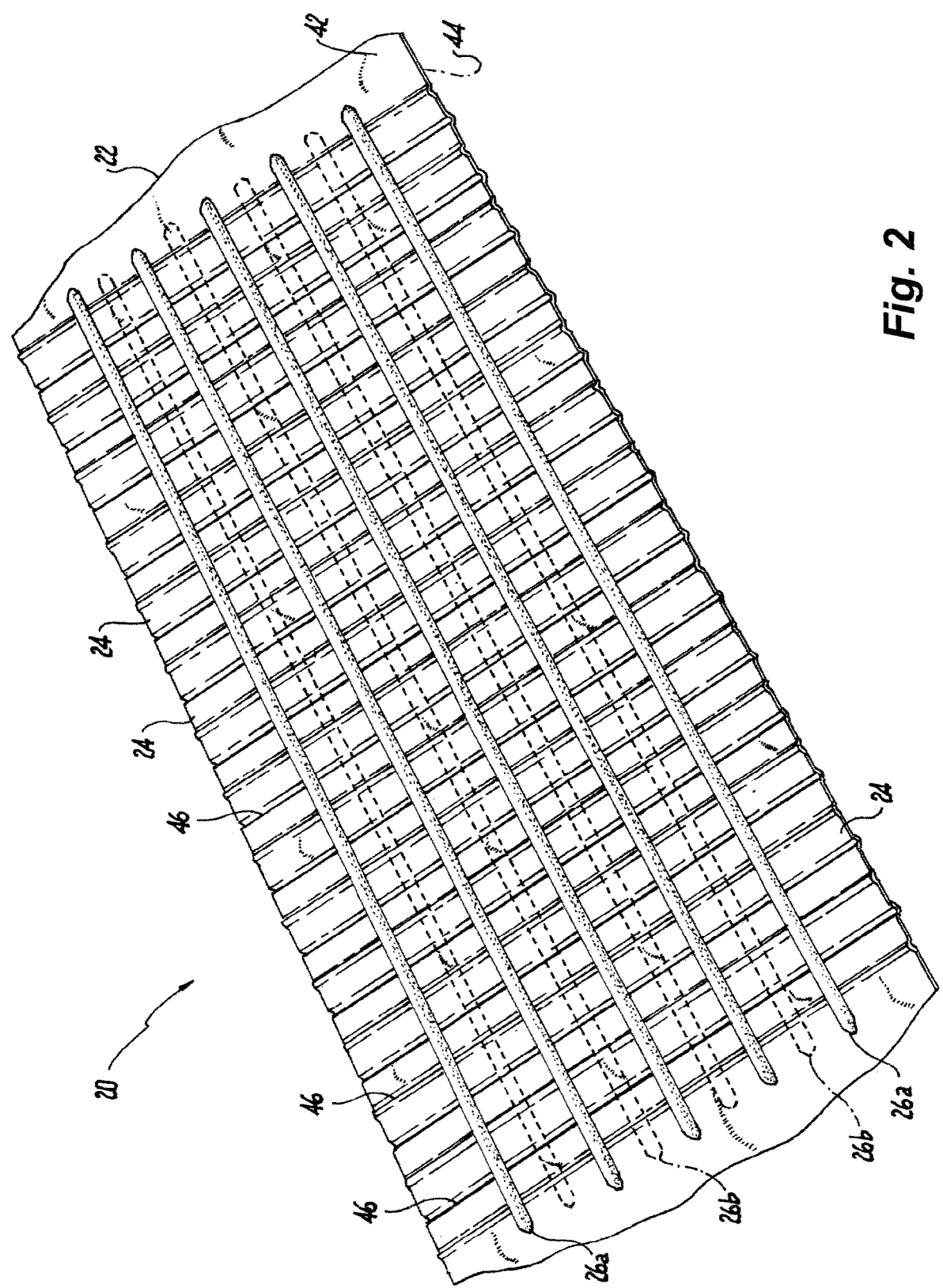
FIG. 2 is a perspective view of a web of filter medium on which continuous glue beads are deposited to form the filter medium of the present invention.
Figure 3:
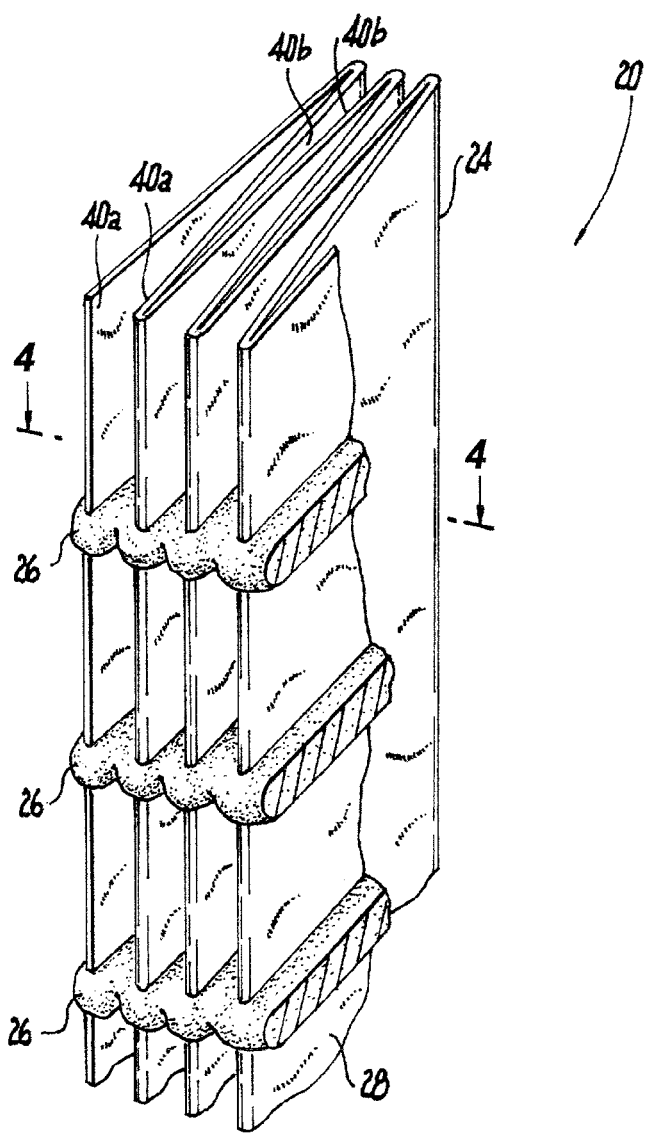
FIG. 3 is an enlarged, perspective view of a section of a filter medium, formed in accordance with the present invention, and illustrating ribs formed between adjacent pleats of the filter medium to maintain the spacing between adjacent pleats.
Figure 4:
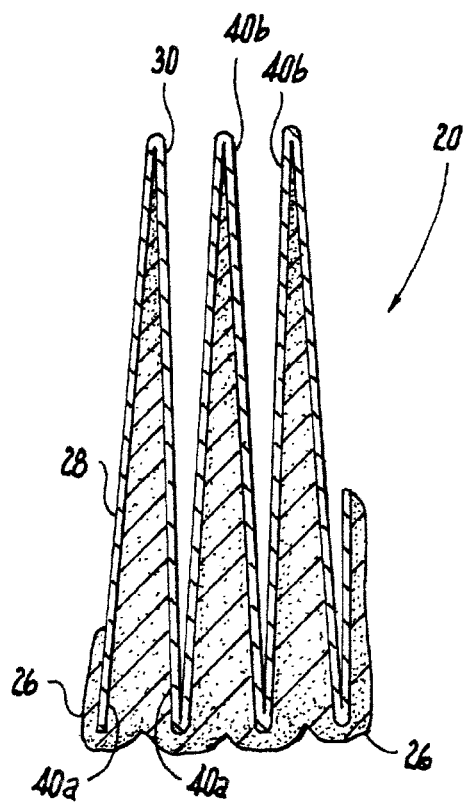
FIG. 4 is a cross-sectional view of the section of filter medium shown in FIG. 3, taken along line 4-4 of FIG. 3.
Figure 5:
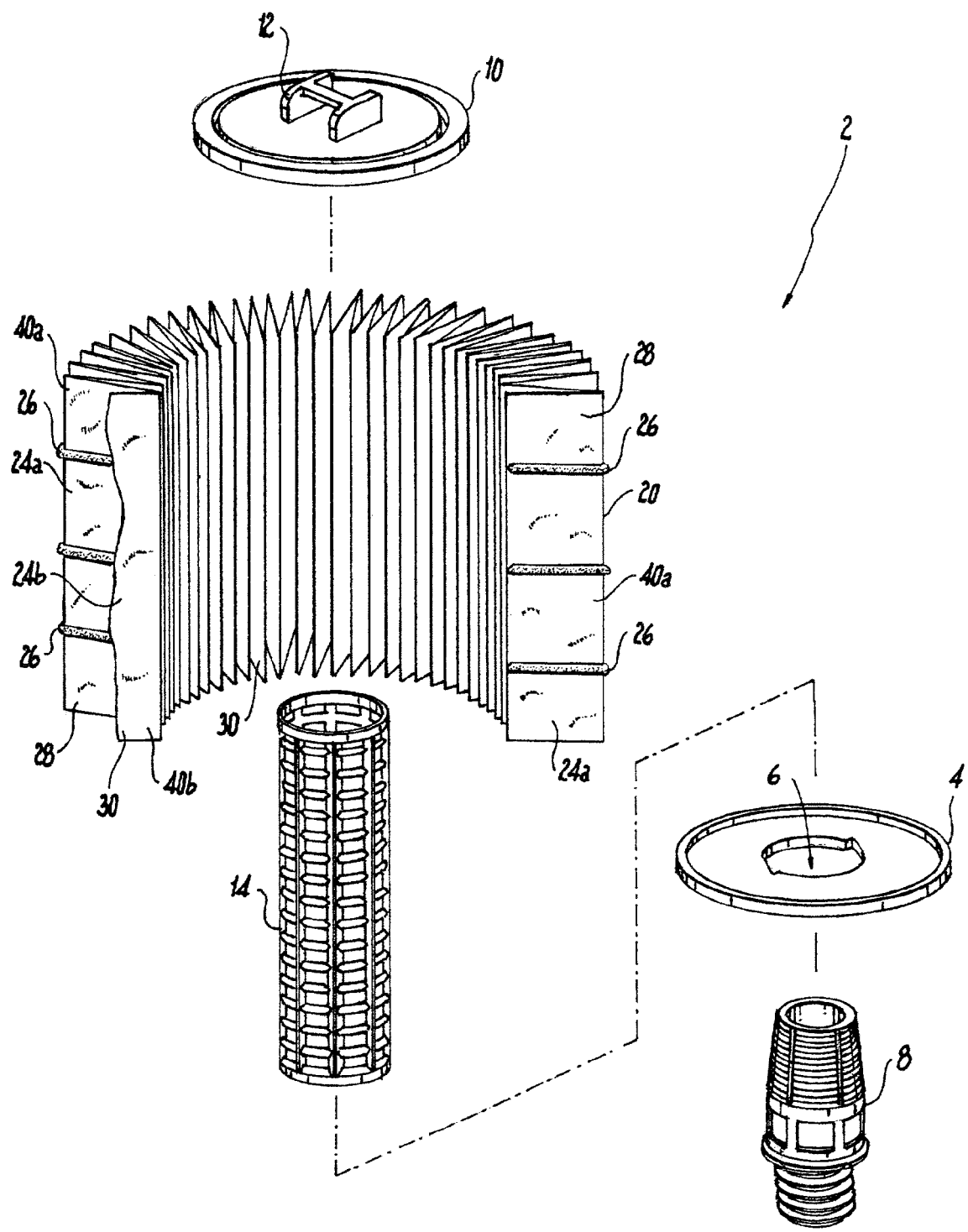
FIG. 5 is an exploded perspective view of a filter cartridge for use with pool or spa filtering apparatus formed in accordance with the present invention.
Figure 6:
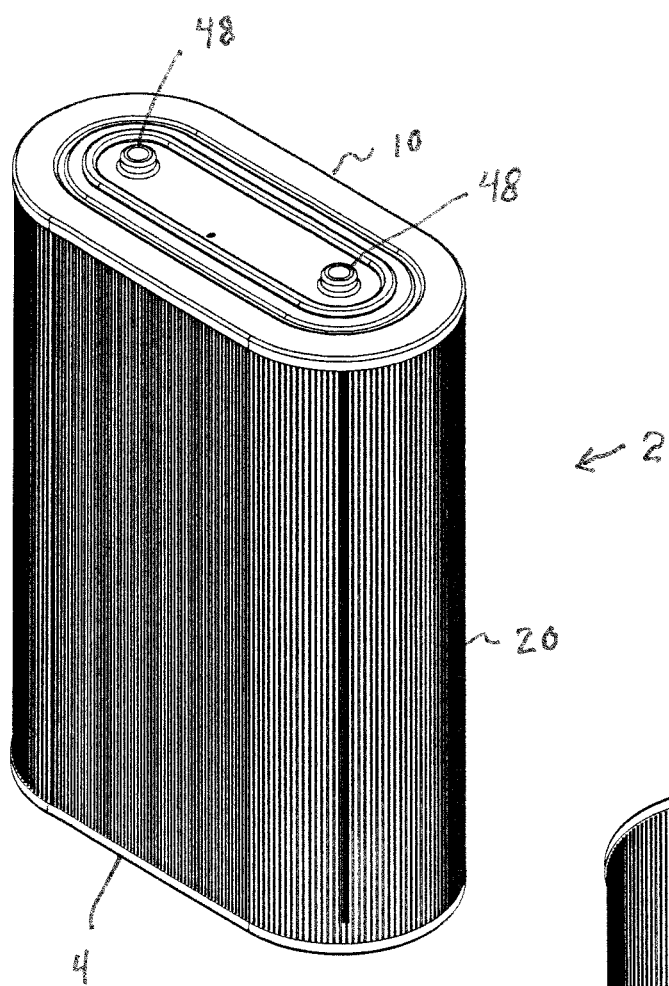
FIG. 6 is a top perspective view of an example of an irregularly-shaped, non-cylindrical filter cartridge for use with a pool or spa filtering apparatus and having a glue beaded medium and which is formed in accordance with the present invention.
Figure 7:
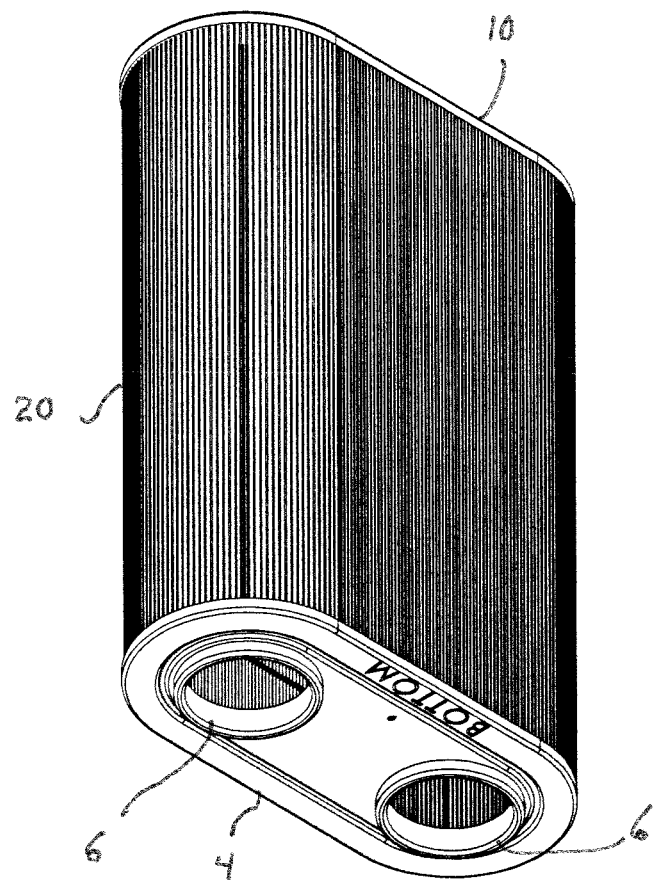
FIG. 7 is a bottom perspective view of an example of an irregularly-shaped, non-cylindrical filter cartridge for use with a pool or spa filtering apparatus and having a glue beaded medium and which is formed in accordance with the present invention.
Figure 8:
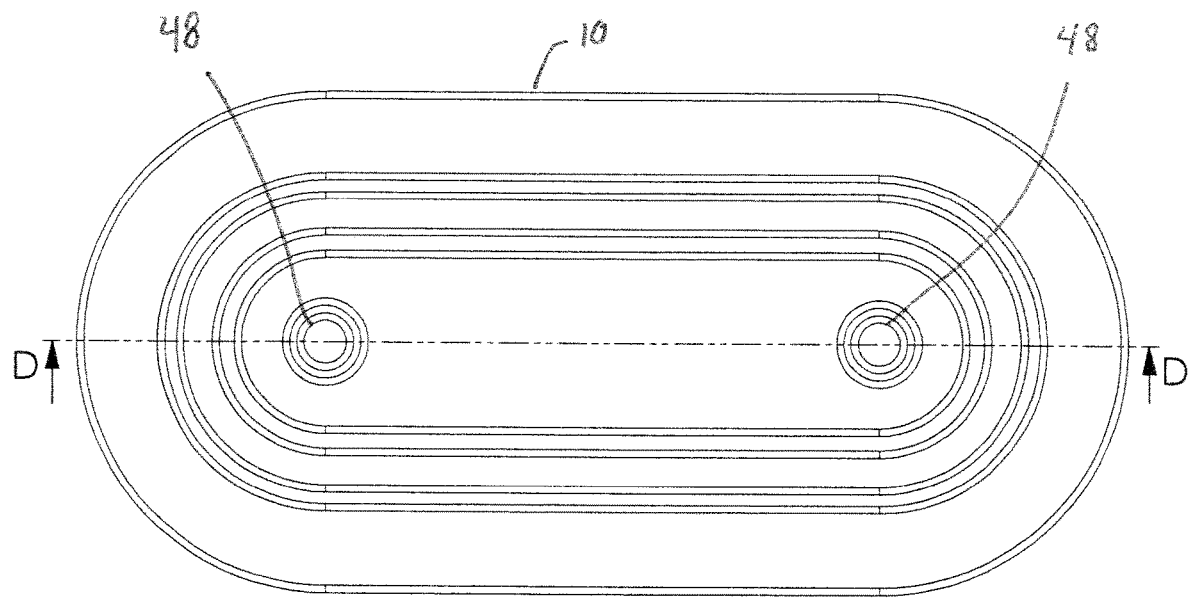
FIG. 8 is a top plan view of the filter cartridge of the present invention shown in FIGS. 6 and 7.
Figure 9:
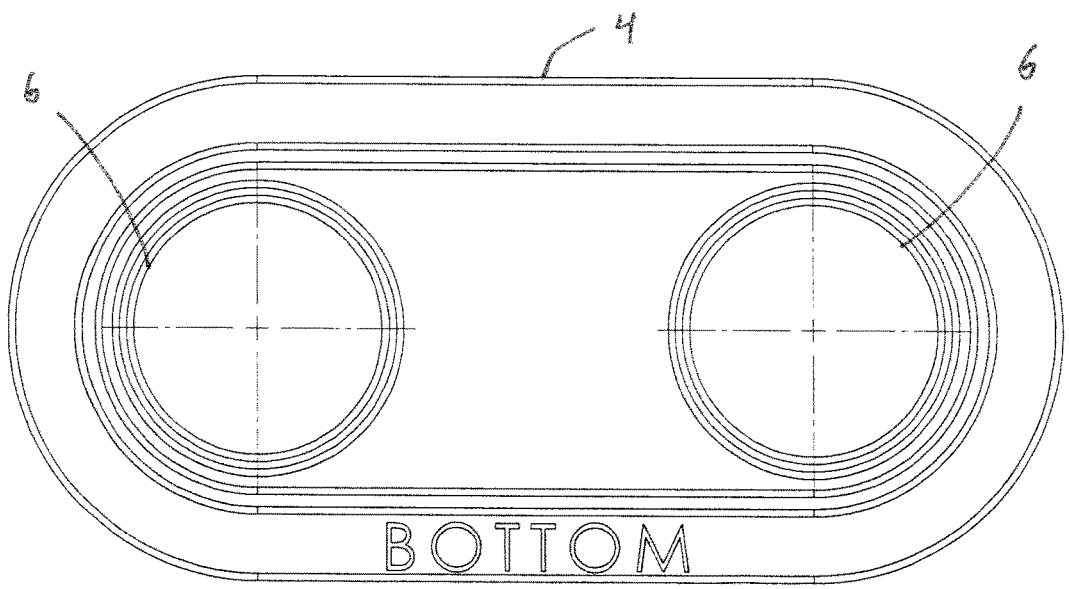
FIG. 9 is a bottom plan view of the filter cartridge of the present invention shown in FIGS. 6 and 7.
Figure 10:
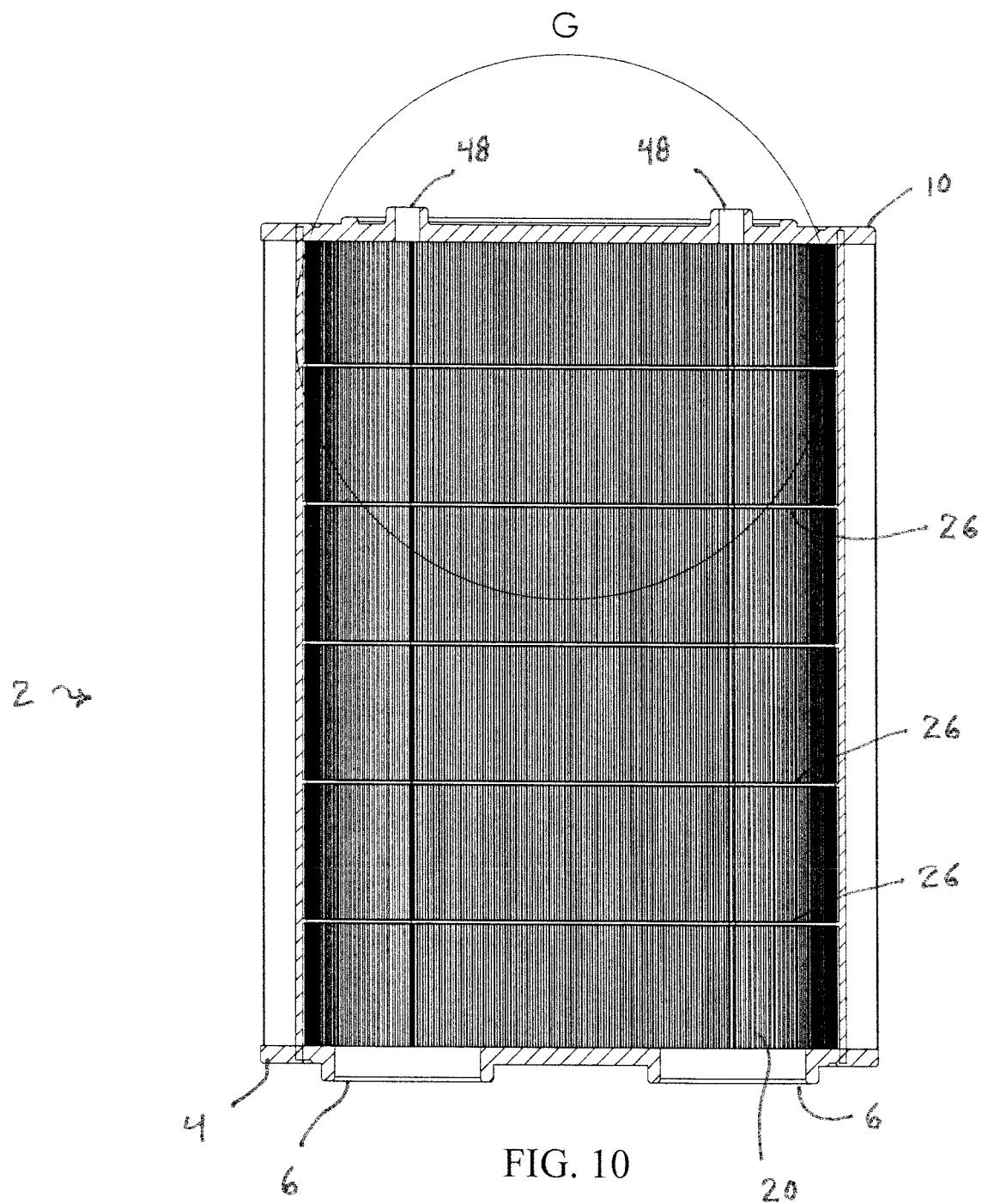
FIG. 10 is a longitudinal cross-sectional view of the filter cartridge of the present invention shown in FIGS. 6-9, taken along line D-D of FIG. 8.
Figure 11:
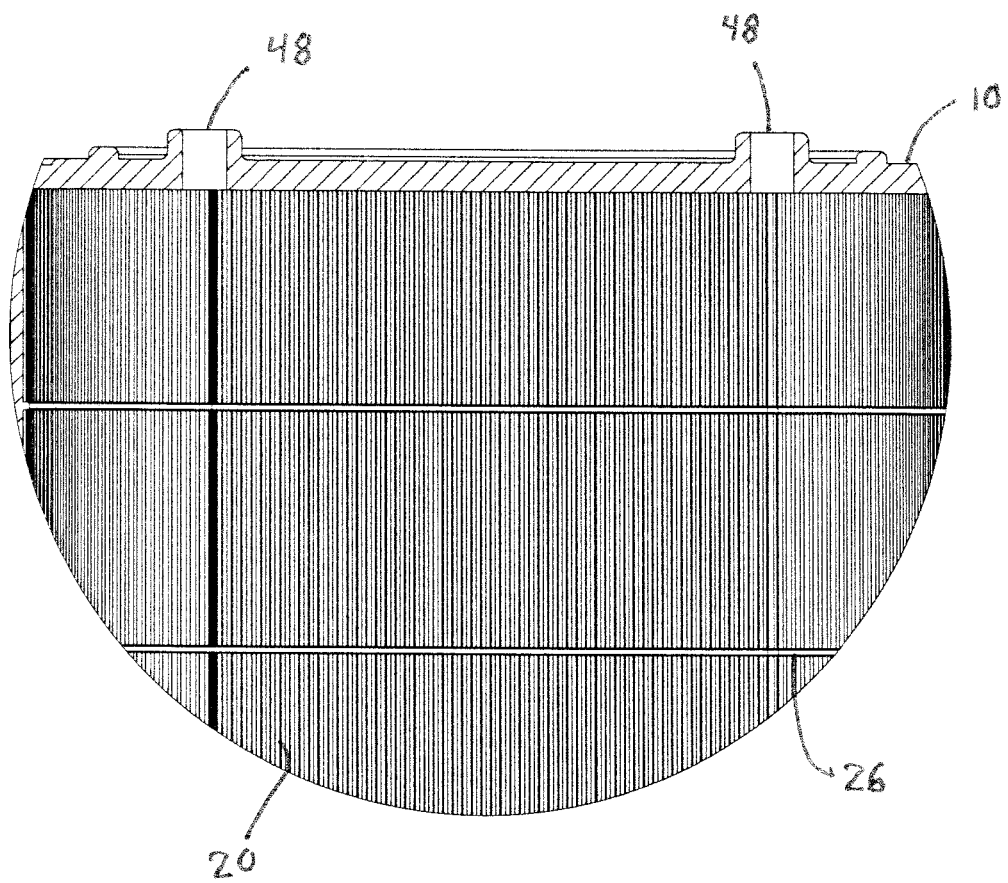
FIG. 11 is an enlarged, detailed, cross-sectional view of a portion of the filter cartridge of the present invention shown in FIG. 10 and within the circle shown in FIG. 10 labeled with the letter G.
Figure 12:
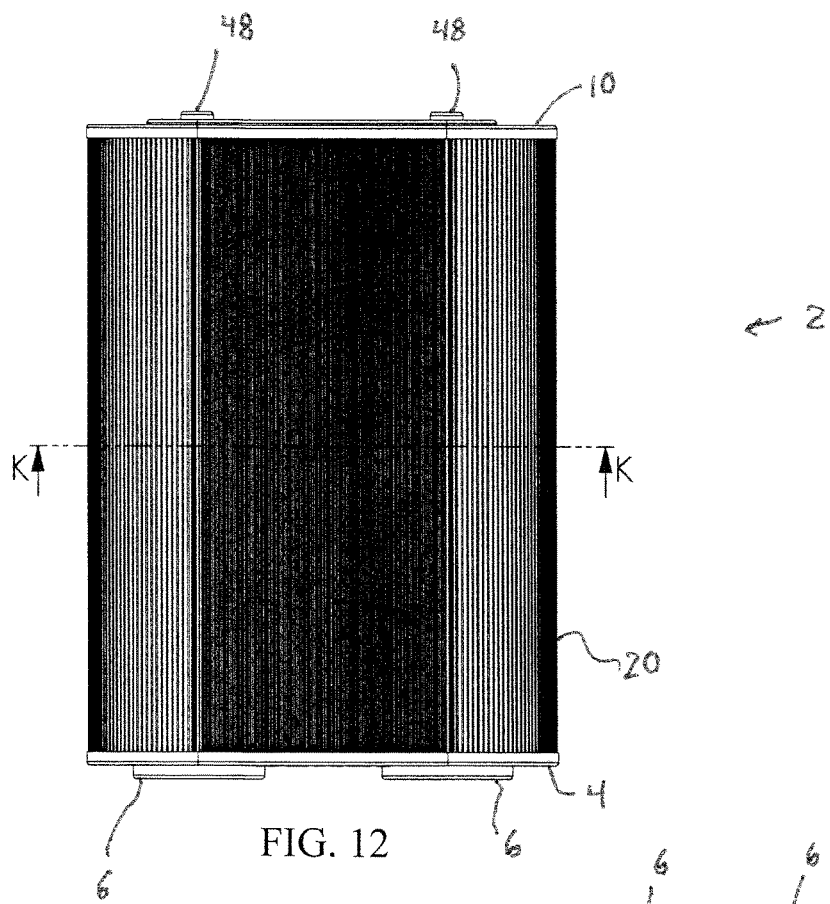
FIG. 12 is a side view of an irregularly-shaped, non-cylindrical filter cartridge for use with a pool or spa filtering apparatus and having a glue beaded filter medium and which is formed in accordance with the present invention, the filter cartridge being similar to that shown in FIGS. 6-11 except that one or more internal support cores are included with the filter cartridge.
Figure 13:
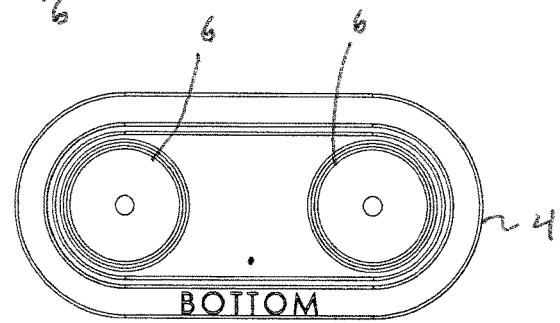
FIG. 13 is a bottom plan view of the filter cartridge of the present invention shown in FIG. 12.
Figure 14:
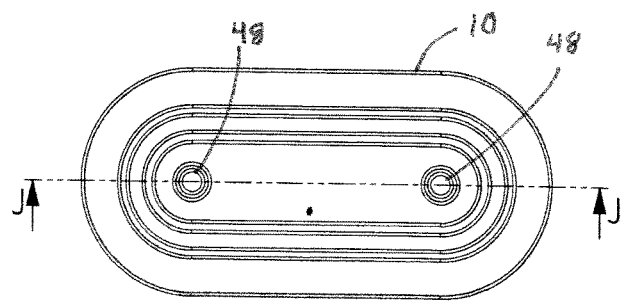
FIG. 14 is a top plan view of the filter cartridge of the present invention shown in FIG. 12.

Referring now to FIGS. 2-5 of the drawings, it will be seen that a filter medium 20 for use with a pool or spa filtering apparatus is preferably formed from an elongated length, or web 22, of spun bonded 100% polyester sheet material. For example, spun bonded polyester commercially available under the trademark REEMAY® may be used.

After pleats 24 are formed in the polyester web 22, one or more parallel, spaced apart, continuous (or intermittent) beads of glue 26 are deposited along the length of the polyester web 22. The beads 26 may be deposited on the front surface 28 of the polyester material 22, the rear surface 30, or both surfaces 28, 30. Furthermore, the continuous beads of glue 26 deposited on the front surface 28 of the polyester web 22 may be offset transversely from the continuous beads of glue 26 deposited on the rear surface 30 of the polyester web 22 in a staggered fashion. When the filter cartridge 2 is assembled with such a glue beaded medium 20, the offset in the glue beads 26 may provide even greater rigidity to the medium 20 and further prevent the medium 20 from collapsing or the pleats 24 closing due to the high pressure of water flowing through the medium 20.

It should be noted that the glue beads 26, when applied to the web 22, need not be continuous in length and may be applied over select portions of the web 22 to define intermittent glue beads 26 which do not reach into, and are not applied to portions of adjacent pleat walls 40a, 40b near where they are joined together to define, valleys in the pleated medium 20, the result being glue beads 26 deposited on facing outer portions of the pleat walls 40a, 40b situated away from the valleys but not in the valleys, on either the outer surface 28, the inner surface 30, or both surfaces 28, 30 of the pleated medium 20.

Preferably, a hot melt glue, such as Part No. HM609, manufactured by Tailored Chemical Company of Hickory, N.C., is applied in parallel lines on the medium web 22 after the pleats are formed in the web 22 but prior to the web 22 being cut to a desired length and folded into the cylindrical shape of a pleated medium 20.

The parallel, spaced apart, continuous or intermittent beads of glue 26 are allowed to set and at least partially solidify on the polyester web 22 for a predetermined period of time, for example, from about 30 seconds to about 1 minute, depending on the open time of the adhesive. The amount of adhesive varies to create sharp triangular shapes potentially of different radii in the subsequent reformation of the pleat pack. Then, preferably, the web 22 is cut to a desired length, and the pleats 24 are folded such that portions of the glue bead 26 on one pleat 24 contact and adhere to portions of the same glue bead 26 on an adjacent pleat 24 of the medium 20. In this way, ribs 34 made of glue are formed between adjacent pleats 24 of the filter medium 20 after the glue has fully solidified, which ribs 34 maintain the spacing between the adjacent pleats 24. Either the glue beads 26 are allowed to fully solidify on the pleated filter medium 20 before the filter cartridge 2 is assembled, or the pleated filter medium 20 may be shaped in a cylindrical form and assembled with the top end cap 10, the bottom end cap 4 and the inner core 14 to form the filter cartridge 2 while the glue beads 26 are solidifying. Thus, not only are the ribs 34 formed between adjacent pleats 24 of the cylindrically-shaped filter medium 20 on its radially outer side, or on its radially inner side, or on both sides, but also at predetermined positions between the pleats 24 along the longitudinal axis of the filter cartridge 2.

The ribs 34 maintain a spacing between adjacent pleats 24 of the filter medium 20 and prevent, or at least minimize, changes in the spacing between pleats 24, the pleats 24 folding against one another, or the filter medium 20 collapsing, due to its exposure to significant water pressure when in use in a pool or spa filter apparatus.

A water filter cartridge 2, filter medium 20 and method of making the filter medium 20, all in accordance with the present invention, will now be further described.

A water filter cartridge 2 for use in filtering the water of a pool, spa and the like, formed in accordance with the present invention, includes a top end cap 10, a bottom end cap 4, a perforated, elongated, central support core 14 (which may be optional) which extends axially between the top end cap 10 and the bottom end cap 4, and a pleated filter medium 20 situated between the top end cap 10 and the bottom end cap 4 and disposed circumferentially about the core 14. The pleated filter medium 20 has an outer surface 28 facing away from the central support core 14, an inner surface 30 situated opposite the outer surface 28 and facing the central support core 14, a plurality of outer pleats 24a formed on the outer surface 28, and a plurality of inner pleats 24b formed on the inner surface 30. The outer pleats 24a include adjacent outer pleat walls 40a which are adjacent to and facing one another. The inner pleats 24b include adjacent inner pleat walls 40b which are adjacent to and facing one another. The pleated filter medium 20 is formed to exhibit a generally cylindrical shape having an axial length.

The pleated filter medium 20 includes at least one glue bead 26 formed on at least one of the outer surface 28 and the inner surface 30. The at least one glue bead 26 is situated on at least one of the adjacent outer pleat walls 40a of the pleated filter medium 20 and adjacent inner pleat walls 40b of the pleated filter medium 20 and disposed circumferentially on the pleated filter medium 20 such that a portion of the at least one glue bead 26 on one adjacent pleat wall 40a, 40b is in contact with and joined to a portion of the at least one glue bead 26 on the other, facing adjacent pleat wall 40a, 40b.

The at least one glue bead 26 of the water filter cartridge 2 preferably includes a plurality of glue beads 26a, 26b spaced apart from one another along the axial length of the pleated filter medium 20, the plurality of glue beads 26a, 26b being formed on the at least one of the outer surface 28 and the inner surface 30 of the pleated filter medium 20. The at least one glue bead 26 preferably includes a plurality of glue beads 26a spaced apart from one another along the axial length of the pleated filter medium 20, the plurality of glue beads 26a being formed on the outer surface 28 of the pleated filter medium 20. Alternatively, the at least one glue bead 26 includes a plurality of glue beads 26b spaced apart from one another along the axial length of the pleated filter medium 20, the plurality of glue beads 26b being formed on the inner surface 30 of the pleated filter medium 20.

Even more preferably, the at least one glue bead 26 includes a first plurality of glue beads 26a spaced apart from one another along the axial length of the pleated filter medium 20, the first plurality of glue beads 26a being formed on the outer surface 28 of the pleated filter medium 20, and the at least one glue bead 26 further includes a second plurality of glue beads 26b spaced apart from one another along the axial length of the pleated filter medium 20, the second plurality of glue beads 26b being formed on the inner surface 30 of the pleated filter medium 20. Also, preferably the glue beads 26a of the first plurality of glue beads 26a formed on the outer surface 28 of the pleated filter medium 20 are offset axially on the pleated filter medium 20 from the glue beads 26b of the second plurality of glue beads 26b formed on the inner surface 30 of the pleated filter medium 20.

A filter medium 20 for use in a water filter cartridge 2 used in filtering the water of a pool, spa and the like, includes an elongated length of web 22 formed from a spun bonded polyester sheet material, the web 22 having a first surface 42 and a second surface 44 situated opposite the first surface 42. As will be seen, when the web 22 is made into a pleated filter medium 20, the first surface 42 will become one of the outer surface 28 and the inner surface 30 of the pleated filter medium 20, and the second surface 44 of the web 22 will become the other of the outer surface 28 and the inner surface 30 of the pleated filter medium 20. The web 22 has at least one glue bead 26 situated on at least one of the first surface 42 and the second surface 44 and extending along at least a portion of the elongated length of web 22. The web 22 is folded to form pleats 24 having adjacent pleat walls 40a, 40b which contain portions of the at least one glue bead 26 such that the portions of the at least one glue bead 26 situated on the adjacent pleat walls 40a, 40b of the pleats 24 on either the first surface 42 or the second surface 44, or both surfaces 42, 44, of the elongated length of web 24 contact with and are joined to one another.

Preferably, the at least one glue bead 26 of the filter medium 20 includes a first plurality of glue beads 26a spaced apart from one another laterally on the elongated length of web 22, the first plurality of glue beads 26a being formed on the first surface 42 of the elongated length of web 22. Even more preferably, the at least one glue bead 26 of the filter medium 20 further includes a second plurality of glue beads 26b spaced apart from one another laterally on the elongated length of web 22, the second plurality of glue beads 26b being formed on the second surface 44 of the elongated length of web 22. Also, preferably, the glue beads 26a of the first plurality of glue beads 26a formed on the first surface 42 of the elongated length of web 22 are offset laterally on the elongated length of web 22 from the glue beads 26b of the second plurality of glue beads 26b formed on the second surface 44 of the elongated length of web 22.

A method of making a pleated filter medium 20 used in a water filter cartridge 2 for use in filtering the water of a pool, spa and the like, in accordance with the present invention, includes the steps of extending a sheet of spun bonded polyester material to form an elongated length of web 22, the web 22 having a first surface 42 and a second surface 44 situated opposite the first surface 42; creasing at least a portion of the elongated length of web 22 to form spaced apart, laterally extending crease lines 46; depositing at least one glue bead 26 on at least one of the first surface 42 and the second surface 44 of the web 22, the at least one glue bead 26 extending longitudinally over at least the portion of the elongated length of the web 22 and extending transversely to the laterally extending crease lines 46; allowing the at least one glue bead 26 to set and at least partially solidify for a predetermined period of time; cutting the web 22 to a desired length; and folding the web 22 at the crease lines 46 to form adjacent pleats therein, the at least partially solidified at least one glue bead having portions thereof disposed on adjacent pleats 24, the glue bead portion on one adjacent pleat 24 contacting with and joining to the glue bead portion on another adjacent pleat 24.

Preferably, the step of depositing at least one glue bead 26 includes the sub-step of depositing a first plurality of glue beads 26a spaced apart from one another laterally on the at least portion of the elongated length of web 22, the first plurality of glue beads 26a being deposited on the first surface 42 of the elongated length of web 22. Even more preferably, the step of depositing at least one glue bead 26 further includes the sub-step of depositing a second plurality of glue beads 26b spaced apart from one another laterally on the at least portion of the elongated length of web 22, the second plurality of glue beads 26b being deposited on the second surface 44 of the elongated length of web 22.

Alternatively, the step of depositing at least one glue bead 26 further includes the sub-step of depositing a second plurality of glue beads 26b spaced from one another laterally on the at least portion of the elongated length of web 22, the second plurality of glue beads 26b being deposited on the second surface 44 of the elongated length of web 22 at positions thereon offset laterally from the positions at which the first plurality of glue beads 26a are deposited on the first surface 42 of the elongated length of web 22.

The glue beads 26 integrally formed with the filter medium 20 provide support for the medium 20 and prevent or minimize the tendency of the medium 20 to collapse under the water pressure exerted on the medium 20 when it is constructed as part of a spa or pool filter cartridge 2 and used in a water filtering apparatus. But also advantageously, a water filter cartridge 2 employing a glue beaded medium 20 constructed in accordance with the present invention, because of the support the glue beads 26 provide to the filter medium 20, can now be made in a way that maximizes the medium 20 present based on the footprint of the filter cartridge housing or the cartridge well in a spa or pool filtering apparatus. Unlike conventional filter cartridge designs, a pool or spa water filter cartridge need not be made in a cylindrical shape. The glue beaded pleat pack (filter medium 20) can take on a shape of an oval, a rectangle or anything that does not conform to a cylindrical design. Since the glue beads 26 provide support for the filter medium 20, no central support core 14 is required, although such may be included in a filter cartridge 2 optionally as additional support.

A first example of an irregularly-shaped (in transverse cross-section), non-cylindrical filter cartridge 2 formed with a glue beaded filter medium 20, with and without a central support core 14, is shown in FIGS. 8-16 of the drawings. In the particular embodiment of the filter cartridge 2 which is shown, the cartridge 2 has a generally oval shape in transverse cross-section.

As can be seen from the figures, the oval-shaped filter cartridge 2 includes a top end cap 10, and an opposite bottom end cap 4, each of which is oval in shape. A glue beaded, pleated filter medium 20 is interposed between the oval top end cap 10 and the oval bottom end cap 4. The glue beaded filter medium 20 is positioned at the peripheral edge portions of the top end cap 10 and the bottom end cap 4 and conforms to the overall oval shape of the end caps 4, 10, thus defining an interior cavity of the filter cartridge 2 which receives the inflow of water passing through the filter medium 20.

The bottom end cap 4 has at least one, but preferably two or more, openings 6 formed through the thickness thereof to allow water passing through the glue beaded filter medium 20 to exit the interior cavity of the filter cartridge 2 defined by the surrounding filter medium 20.

The lower portion 50 of the housing of the water filtering apparatus (see FIGS. 22-24) in which the oval filter cartridge 2 of the present invention is intended to be used had originally accommodated two side-by-side, cylindrically-shaped filter cartridges. Accordingly, two filter cartridge connectors 52 mounted in the lower portion 50 of the housing would mate with respective cylindrically-shaped, conventional filter cartridges. The volume of water that is filtered by the conventional pair of cylindrical filter cartridges would be limited by the area of each filter cartridge's medium.

However, with the oval shape of the filter cartridge 2 of the present invention, now made possible by the incorporation of the glue beads 26 on either the outer surface 28, the inner surface 30, or both surfaces 28, 30 of the pleated filter medium 20, there is significantly more surface area of filter medium 20 that the water entering the filtering apparatus is exposed to, thus increasing the filtering capacity of the filtering apparatus compared to when two conventional, cylindrically-shaped filter cartridges are used therein.

As mentioned previously, the bottom end cap 4, as shown in FIG. 9 of the drawings, includes two relatively large water egress openings 6 formed through the thickness thereof and which fluidly communicate with the internal cavity of the filter cartridge 2. The water egress openings 6 mate with the connectors 52 formed in the bottom portion 50 of the housing of the filtering apparatus. Alternatively, separate connectors 8 may be inserted in the water egress openings 6 and selectively retained therein by a press fit or threaded connection, such connectors 8 being coupleable to openings 54 or mating connectors 56 formed in the filtering apparatus (see FIG. 24). Water passing through the glue beaded filter medium 20 into the interior cavity of the filter cartridge 2 defined by the filter medium 20 flows through the relatively large openings 6 in the bottom end cap 4, which filtered water is pumped back to the pool or spa to which the filtering apparatus is connected.

The opposite top end cap 10 may also include openings 48 formed through the thickness thereof. The openings 48 formed through the thickness of the top end cap 10 are relatively smaller, when compared to the water egress openings 6 formed in the bottom end cap 4. These openings 48 may be provided for receiving a rod (not shown) passing at least partially through the filter cartridge 2 to help secure the filter cartridge 2 in place within the filtering apparatus. Alternatively, the top end cap openings 48 may accommodate pressure relief tubes (not shown) passing therethrough and through the internal cavity of the filter cartridge, the axial ends of such tubes being connected to a pressure relief mechanism (not shown).

Figure 15:
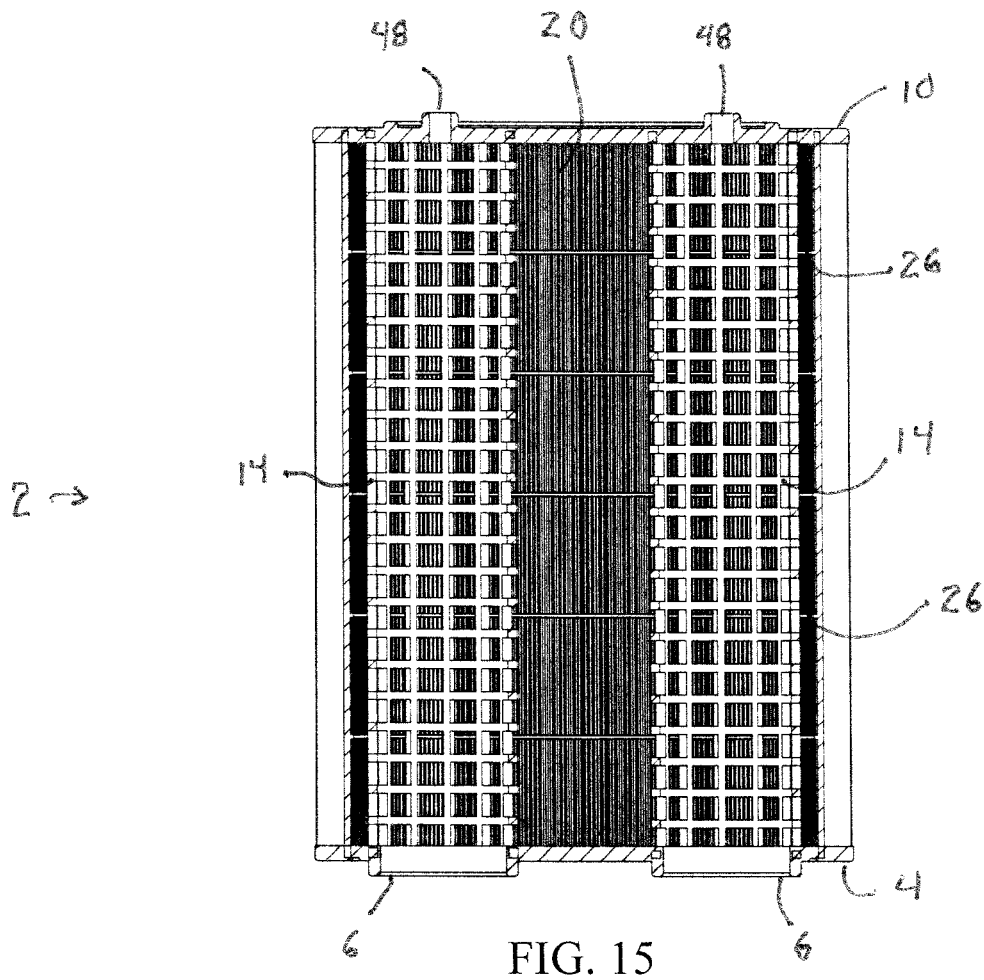
FIG. 15 is a longitudinal cross-sectional view of the filter cartridge of the present invention shown in FIGS. 12-14, taken along line J-J of FIG. 14.
Figure 16:
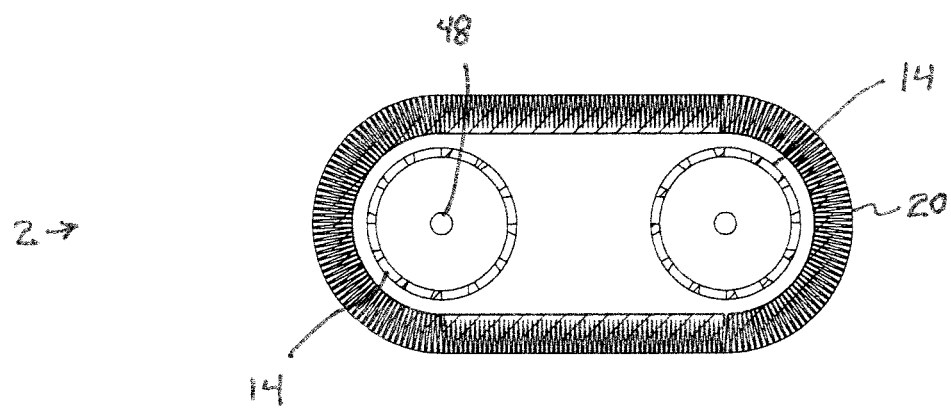
FIG. 16 is a transverse cross-sectional view of the filter cartridge of the present invention shown in FIGS. 12-15, taken along line K-K of FIG. 12.
Figure 20:
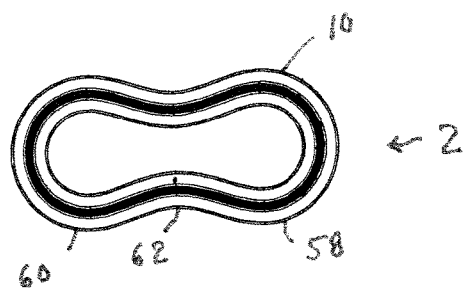
FIG. 20 is a top plan view of the filter cartridge of the present invention shown in FIGS. 17-19.
Figure 18:
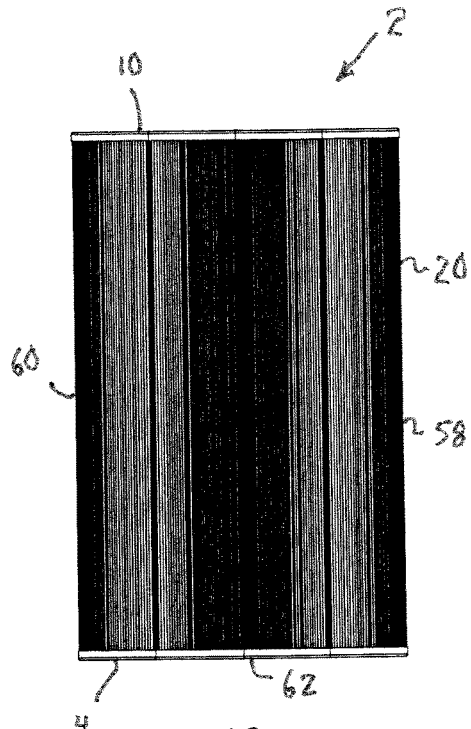
FIG. 18 is a front elevational view of the filter cartridge of the present invention shown in FIG. 17.
Figure 19:
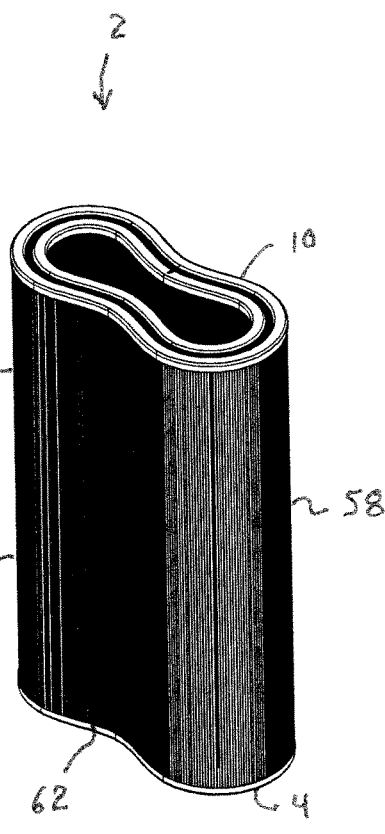
FIG. 19 is a lateral side elevational view of the filter cartridge of the present invention shown in FIGS. 17 and 18.
Figure 17:
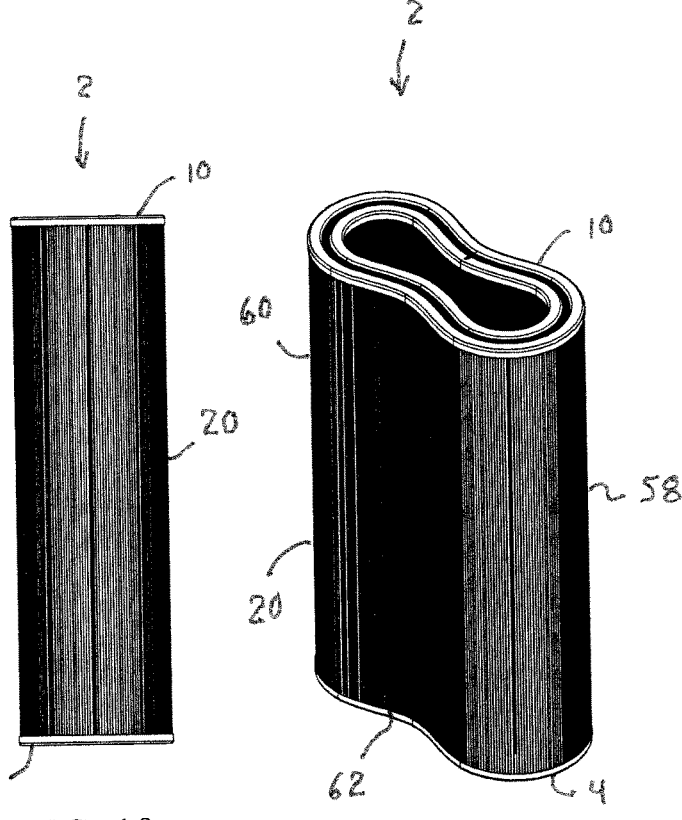
FIG. 17 is a top perspective view of a second example of an irregularly-shaped, non-cylindrical filter cartridge for use with a pool or spa filtering apparatus and having a glue beaded medium and which is formed in accordance with the present invention.
Figure 21:
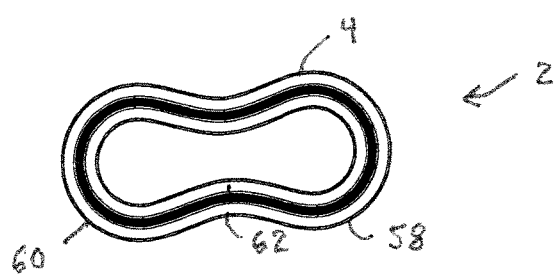
FIG. 21 is a bottom plan view of the filter cartridge of the present invention shown in FIGS. 17-20.

If desired, and as shown in FIGS. 12-16 of the drawings, the oval-shaped filter cartridge 2 may include one or more perforated support cores 14 to provide additional support to the filter medium 20 to that already provided by the glue beads 26 integrally formed with the filter medium 20. As shown in FIGS. 15 and 16, it is envisioned that two spaced apart, cylindrical support cores 14 are situated within the internal cavity of the filter cartridge 2 and in proximity to the major axis ends of the oval shaped filter cartridge 2. Of course, it is envisioned to form the filter cartridge 2 with one or more interior support cores 14 having different shapes, such as oval, or having two cylindrical support cores 14 interconnected by one or more intermediary, planar, parallel sections of support cores bridging and connected to the two cylindrical support cores 14.

FIGS. 17-31 illustrate another embodiment of an irregularly-shaped, non-cylindrical filter cartridge employing a glue beaded filter medium 20, the glue beads 26 of which support the pleats 24 of the filter medium 20 or at least minimize the tendency of the pleats 24 to collapse.

As mentioned previously, a filter cartridge 2 formed with glue beads 26 which provide support for the filter medium 20 used therein is less likely to collapse due to the support provided by the glue beads 26 and may be formed in many irregular shapes other than cylindrical, as in many instances the internal perforated support core 14 is no longer required, although such may be included in the filter cartridge 2 to provide additional support. What is shown in FIGS. 17-31 is another example of such an irregularly-shaped filter cartridge 2, this filter cartridge 2 being formed with a modified "figure eight" or serpentine shape in transverse cross-section. Thus, the filter cartridge 2 shown in FIGS. 17-31, by way of example, is formed with a first lateral side portion 58, a second lateral side portion 60 situated laterally opposite the first lateral side portion 58, and an intermediate portion 62 interposed between and connected with the first and second lateral side portions 58, 60. Each of the first lateral side portion 58, the second lateral side portion 60 and the intermediate portion 62 of the filter cartridge 2 has a width associated therewith. The width of the intermediate portion 62 is less than the width of the first lateral side portion 58, and the width of the intermediate portion 62 is less than the width of the second lateral side portion 60, thereby providing the filter cartridge 2 with the modified figure eight shape in transverse cross-section.

Figure 22:
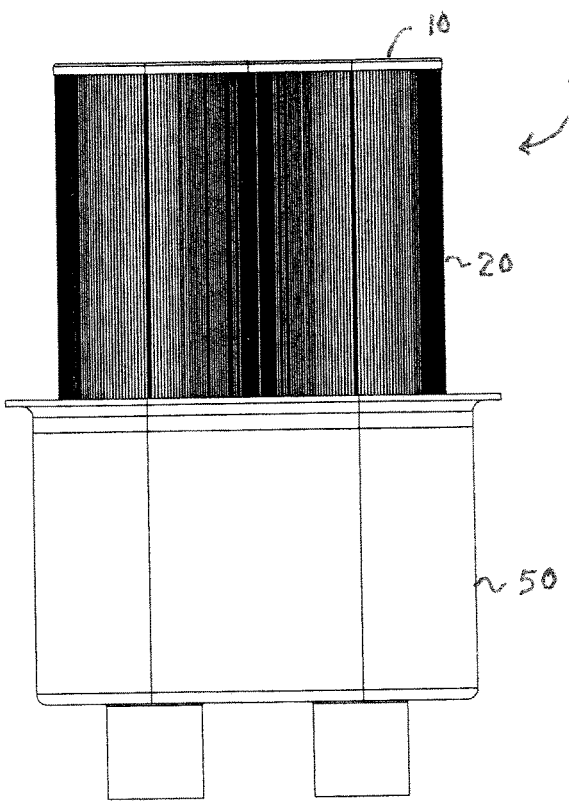
FIG. 22 is a front elevational view of the filter cartridge of the present invention shown in FIGS. 17-21 and illustrating the filter cartridge mounted in the lower portion of the housing of a filtering apparatus.
Figure 23:
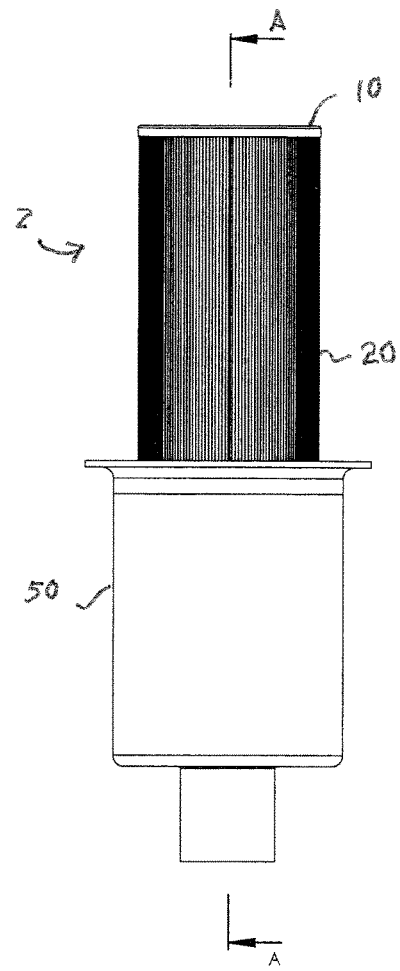
FIG. 23 is a lateral side elevational view of the filter cartridge of the present invention and the lower portion of the housing of the filtering apparatus shown in FIG. 22.
Figure 24:
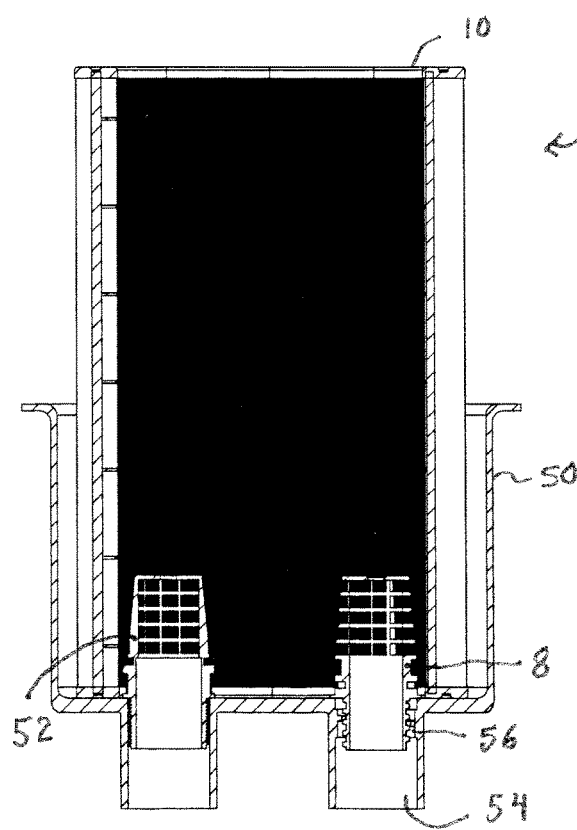
FIG. 24 is a longitudinal cross-sectional view of the filter cartridge of the present invention and the lower portion of the housing of the filtering apparatus shown in FIGS. 22 and 23, taken along line A-A of FIG. 23.
Figure 25:
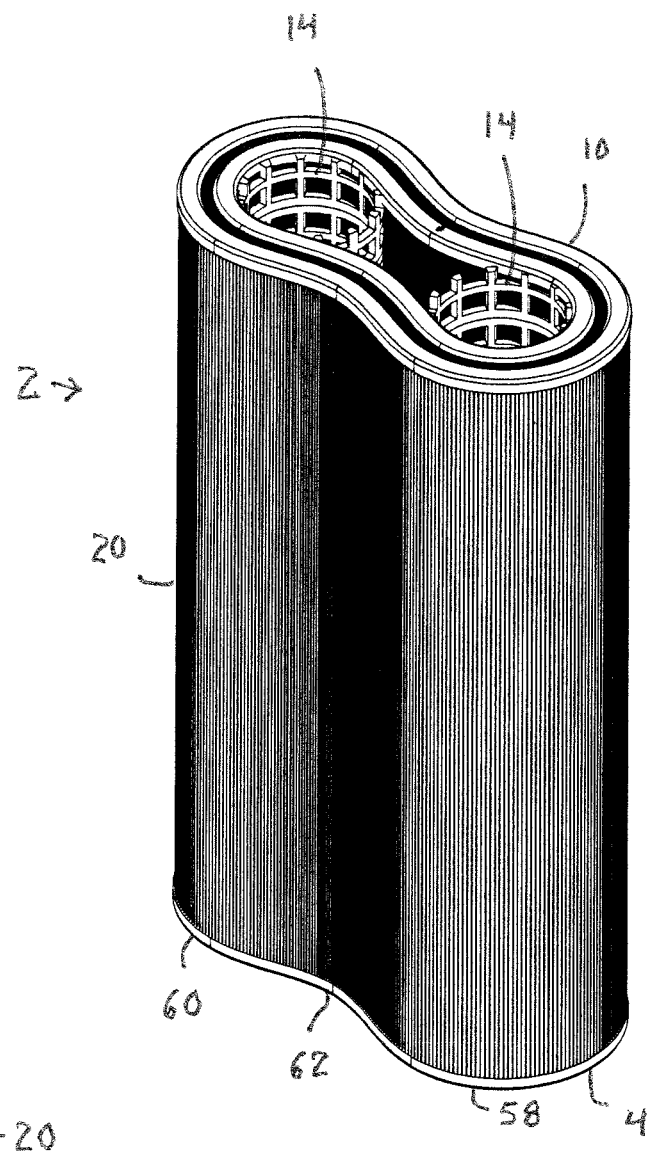
FIG. 25 is a top perspective view of an irregularly-shaped, non-cylindrical filter cartridge for use with a pool or spa filtering apparatus and having a glue beaded filter medium and which is formed in accordance with the present invention, the filter cartridge being similar to that shown in FIGS. 17-24 except that one or more internal support cores are included with the filter cartridge.
Figure 26:
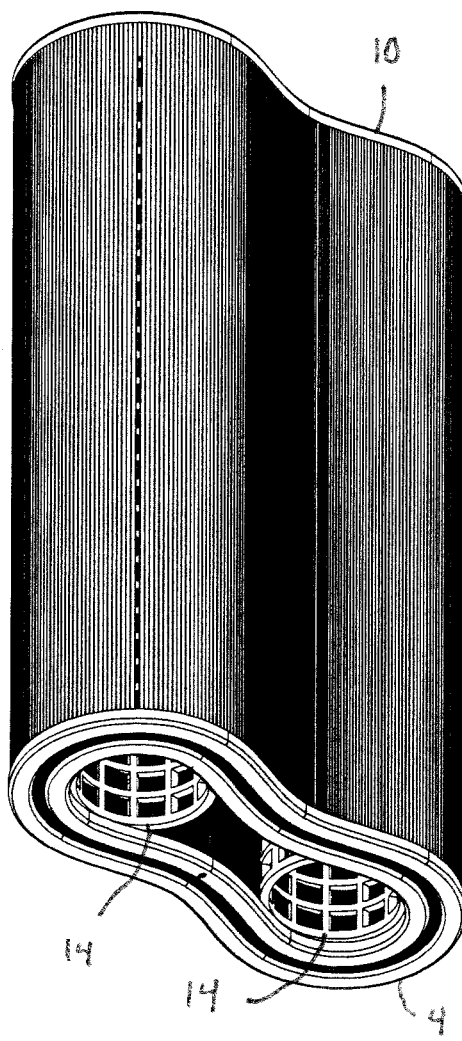
FIG. 26 is a bottom perspective view of the filter cartridge of the present invention shown in FIG. 25.
Figure 29:
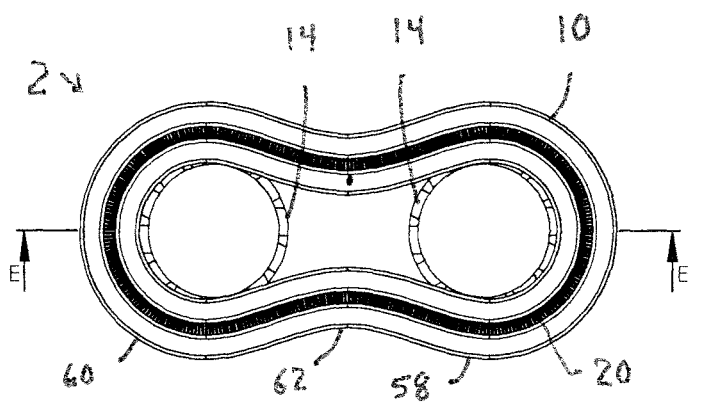
FIG. 29 is a top plan view of the filter cartridge of the present invention shown in FIGS. 25-28.
Figure 27:
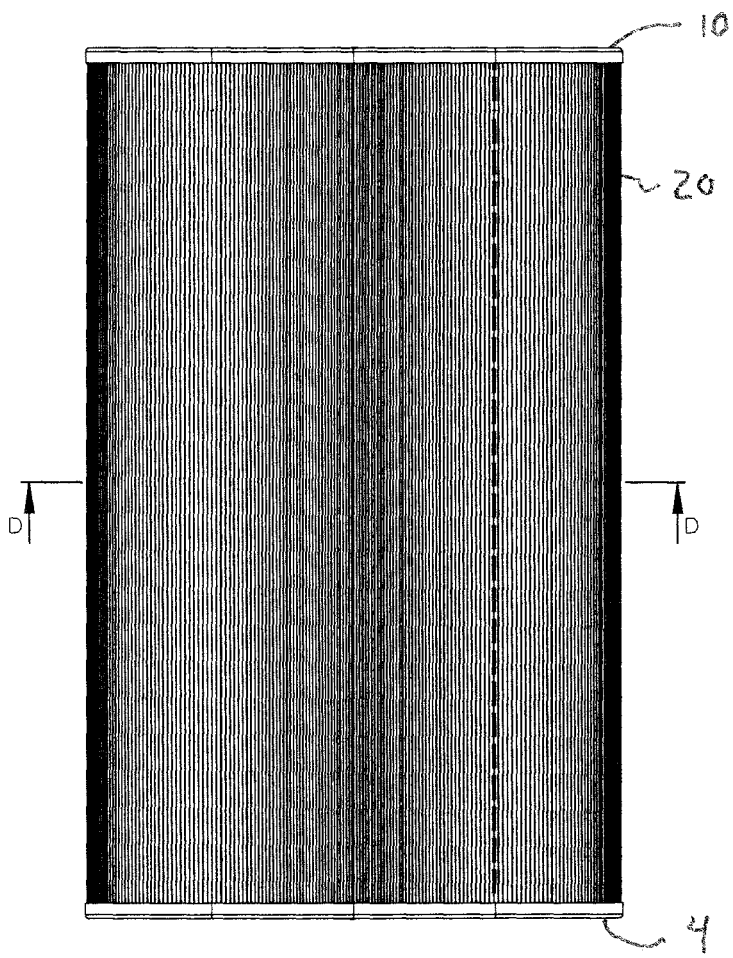
FIG. 27 is a front elevational view of the filter cartridge of the present invention shown in FIGS. 25 and 26.
Figure 28:
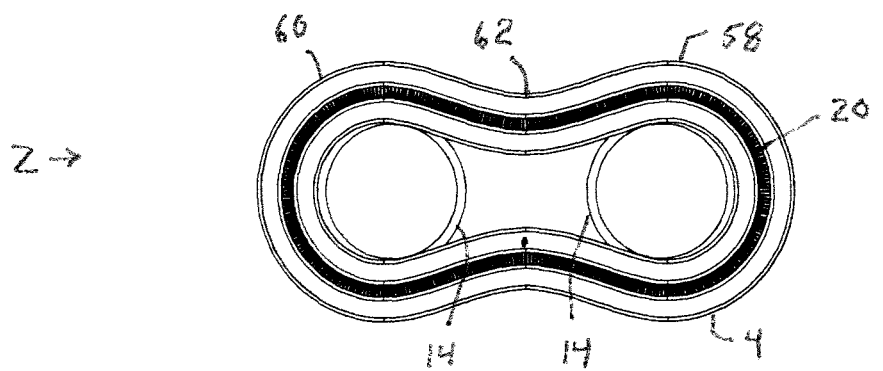
FIG. 28 is a bottom plan view of the filter cartridge of the present invention shown in FIGS. 25-27.
Figure 30:
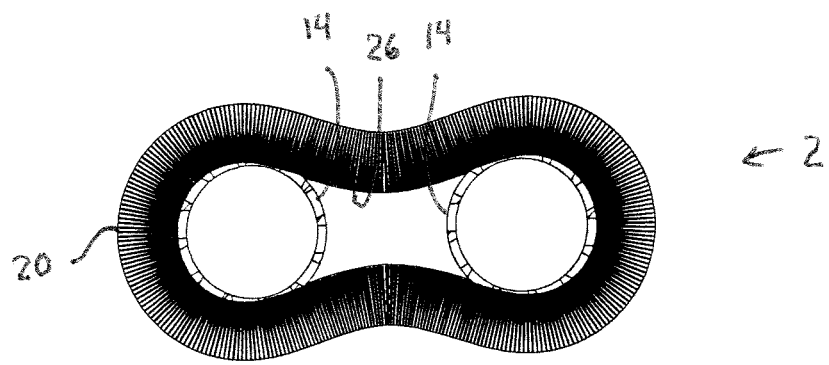
FIG. 30 is a transverse cross-sectional view of the filter cartridge of the present invention shown in FIGS. 25-29, taken along line D-D of FIG. 27.
Figure 31:
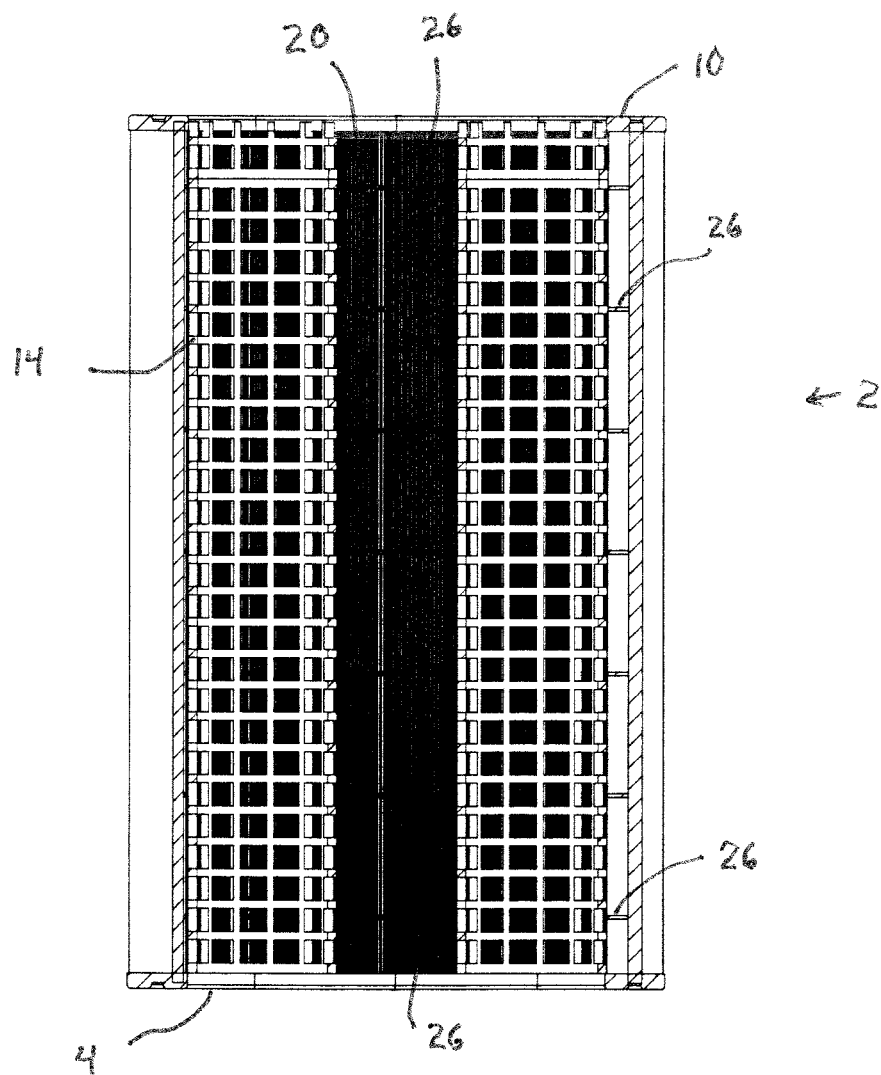
FIG. 31 is a longitudinal cross-sectional view of the filter cartridge of the present invention shown in FIGS. 25-30, taken along line E-E of FIG. 29.

The filter medium 20, being formed with a plurality of glue beads 26 which encircle the filter medium 20 either on the outer surface 28 thereof, the inner surface 30 or both surfaces 28, 30, and spaced apart from each other axially on the filter cartridge 2, may be shaped to conform to the shape of the top end cap 10 and the bottom end cap 4 of the filter cartridge 2 between which the filter medium 20 is interposed such that, in the example shown in FIGS. 17-31, the filter medium 20 exhibits this modified figure eight shape. As shown in FIGS. 22-24, the filter cartridge 2, having this figure eight or serpentine shape, is received by the bottom portion 50 of the housing of a filtering apparatus that conventionally would have received a pair of cylindrically-shaped filter cartridges. As can be seen from FIGS. 22-24 of the drawings, the filter cartridge 2 of the present invention, which replaces the pair of conventional, cylindrically-shaped filter cartridges in this filtering apparatus, provides additional surface area of filter medium 20 to which the water to be filtered is exposed, when compared to the two conventional, cylindrically-shaped filter cartridges which normally would have been received by the filtering apparatus shown in FIGS. 22-24, in the same manner as the oval filter cartridge 2 of the present invention formed with the glue beaded medium 20 that is shown in FIGS. 6-16 of the drawings provides additional filter medium surface area. The connectors 8, 52 of the bottom portion 50 of the filtering apparatus partially extend into the internal cavity of the filter cartridge 2 defined by the glue beaded filter medium 20 and, more specifically, in alignment with the relatively wider first and second lateral side portions 58, 60 of the filter cartridge 2.

However, if additional support for the filter cartridge 2 and medium 20 is desired, then the filter cartridge 2 of the present invention may include one or more internal, perforated support cores 14 situated within the internal cavity of the filter cartridge 2, as shown in FIGS. 25-31 of the drawings. In the embodiment of the filter cartridge 2 shown in FIGS. 25-31, two cylindrically-shaped, perforated support cores 14 are located within the internal cavity of the filter cartridge, each core 14 being positioned to be in alignment with either the relatively wider first lateral side portion 58 or the relatively wider second lateral side portion 60 of the filter cartridge 2. Of course, it is envisioned to form the support cores 14 with different shapes then merely cylindrical, such as having a single support core also having a figure eight or serpentine shape, or having two cylindrical support cores interconnected to each other by one or more intermediary, planar, parallel sections of support cores bridging and connected to the two cylindrical support cores.

As mentioned previously, the glue beads 26 provide sufficient support for the pleated filter medium 20 such that, in many instances, the perforated inner support core 14 may be omitted. Such allows even greater flexibility in the design of a coreless filter cartridge, as now there is no core 14 which could otherwise interfere with or determine the position of the coupling connector 8 on the bottom or top end cap 4, 10 of the filter cartridge 2. More specifically, one or more connectors 8 may now be received by respective water egress openings 6 situated in positions on the end cap or end caps 4, 10 and not constrained to be in alignment with the core 14. In conventional pool or spa filter cartridges that require an inner support core 14, the water egress opening 6 and connector 8 received thereby need to be positioned in axial alignment with the core 14, as a portion of the connector 8 extends into the bore of the support core 14. However, with the filter cartridge 2 of the present invention formed with a glue beaded medium 20 and not requiring a core 14, the connector body portion merely extends through the end cap 4, 10 on which it is mounted and into the more open area of the internal cavity of the filter cartridge 2.

Additionally, connectors 8 for conventional filter cartridges, such as shown in FIG. 1 of the drawings, need to be cylindrical in shape and particularly dimensioned so as to be partially received by the bore of the cylindrically-shaped, perforated support core 14. Since with the filter cartridge 2 of the present invention having no inner support core 14, the coupling connector 8 may now be formed in many different shapes, such as rectangular or oval in transverse cross-section, and with cross-sectionally larger bores than connectors 8 used with conventional, cylindrically-shaped filter cartridges, as there is no inner support core 14 that would have otherwise constrained the shape and bore size of the connector 8.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. A water filter cartridge for use in filtering the water of a pool, spa and the like, which comprises:
    a top end cap;
    a bottom end cap; and
    a pleated filter medium situated between the top end cap and the bottom end cap, the pleated filter medium having an outer surface, an inner surface situated opposite the outer surface, a plurality of outer pleats formed on the outer surface, and a plurality of inner pleats formed on the inner surface, the outer pleats including adjacent outer pleat walls which are adjacent to and facing one another, the inner pleats including adjacent inner pleat walls which are adjacent to and facing one another, the pleated filter medium having an axial length;
    wherein the pleated filter medium includes at least one glue bead formed on at least one of the outer surface and the inner surface, the at least one glue bead being situated on at least one of the adjacent outer pleat walls of the pleated filter medium and adjacent inner pleat walls of the pleated filter medium and disposed circumferentially on the pleated filter medium such that a portion of the at least one glue bead on one adjacent pleat wall is in contact with and joined to a portion of the at least one glue bead on the other, facing adjacent pleat wall;
    wherein the water filter cartridge is non-cylindrical in overall shape; and
    wherein the water filter cartridge has generally a modified figure eight shape in transverse cross-section, the filter cartridge having a first lateral side portion, a second lateral side portion situated laterally opposite the first lateral side portion, and an intermediate portion interposed between and connected with the first and second lateral side portions, each of the first lateral side portion, the second lateral portion and the intermediate portion of the filter cartridge having a width associated therewith, the width of the intermediate portion being less than the width of the first lateral side portion, and the width of the intermediate portion being less than the width of the second lateral side portion, thereby providing the filter cartridge with the modified figure eight shape in transverse cross-section.

2. A water filter cartridge as defined by claim 1, wherein the at least one glue bead includes a plurality of glue beads spaced apart from one another along the axial length of the pleated filter medium, the plurality of glue beads being formed on the at least one of the outer surface and the inner surface of the pleated filter medium.

3. A water filter cartridge as defined by claim 1, wherein the at least one glue bead includes a plurality of glue beads spaced apart from one another along the axial length of the pleated filter medium, the plurality of glue beads being formed on the outer surface of the pleated filter medium.

4. A water filter cartridge as defined by claim 1, wherein the at least one glue bead includes a plurality of glue beads spaced apart from one another along the axial length of the pleated filter medium, the plurality of glue beads being formed on the inner surface of the pleated filter medium.

5. A water filter cartridge as defined by claim 1, wherein the at least one glue bead includes a first plurality of glue beads spaced apart from one another along the axial length of the pleated filter medium, the first plurality of glue beads being formed on the outer surface of the pleated filter medium; and
    wherein the at least one glue bead further includes a second plurality of glue beads spaced apart from one another along the axial length of the pleated filter medium, the second plurality of glue beads being formed on the inner surface of the pleated filter medium.

6. A water filter cartridge as defined by claim 5, wherein the glue beads of the first plurality of glue beads formed on the outer surface of the pleated filter medium are offset axially on the pleated filter medium from the glue beads of the second plurality of glue beads formed on the inner surface of the pleated filter medium.

7. A water filter cartridge as defined by claim 1, which further comprises:
    a perforated, elongated, central support core which extends axially between the top end cap and the bottom end cap;

wherein the pleated filter medium is disposed circumferentially about the core, the outer surface of the pleated filter medium facing away from the central support core, and the inner surface of the pleated filter medium facing the central support core, the pleated filter medium being formed to exhibit a generally cylindrical shape.

\* \* \* \* \*